June 30, 1970 R. K. H. GEBEL ET AL 3,518,416

APPARATUS FOR OBTAINING COMPUTER INPUT DATA FROM UNKNOWN CURVES

Filed Jan. 3, 1968 5 Sheets-Sheet 1

INVENTORS
RADAMES K. H. GEBEL
HENRY E. FETTIS
BY Harry A. Herbert Jr
ATTORNEYS
Richard J. Killoran
AGENT

APPARATUS FOR OBTAINING COMPUTER INPUT DATA FROM UNKNOWN CURVES

INVENTORS
RADAMES K.H. GEBEL
HENRY E. FETTIS
BY Harry A. Herbert Jr
ATTORNEY
Richard J. Killoran
AGENT June 30, 1970 R. K. H. GEBEL ET AL 3,518,416

APPARATUS FOR OBTAINING COMPUTER INPUT DATA FROM UNKNOWN CURVES

Filed Jan. 3, 1968 5 Sheets-Sheet 3

INVENTORS
RADAMES K. H. GEBEL
HENRY E. FETTIS
BY Harry A. Herbert Jr.
ATTORNEY
Richard J. Killoran
AGENT INVENTORS
RADAMES K. H. GEBEL
HENRY E. FETTIS
BY Harry A. Herbert Jr
ATTORNEY
Richard J. Killoren
AGENT

APPARATUS FOR OBTAINING COMPUTER INPUT DATA FROM UNKNOWN CURVES

Filed Jan. 3, 1968 5 Sheets-Sheet 5

INVENTORS
RADAMES K. H. GEBEL
HENRY E. FETTIS
BY Harry A. Herbert Jr.
ATTORNEY
Richard J. Killoren
AGENT 3,518,416

APPARATUS FOR OBTAINING COMPUTER INPUT DATA FROM UNKNOWN CURVES

Radames K. H. Gebel, Dayton, and Henry E. Fettis, Kettering, Ohio, assignors to the United States of America as represented by the Secretary of the Air Force Filed Jan. 3, 1968, Ser. No. 695,384
Int. Cl. G06f *15/34*
U.S. Cl. 235—197 3 Claims

ABSTRACT OF THE DISCLOSURE

Discrete sections of an unknown curve on a mask are compared with discrete sections of known functions on a continuous film by means of a light source and a plurality of photocells. The film also contains binary information describing the functions for the separate sections of the known curves. When correlation or registry between sections of the curves is achieved, a gate circuit is opened to supply the film information for that section of the curve to a storage drum for later application to a computer. Since the film is moved in the $y$ direction, a time signal relating to two coordinate systems at the time of correlation is also supplied to the storage drum. A templet containing a limited number of curves around its periphery and a protractor and its own coordinate markings thereon is provided according to another embodiment of the invention.

BACKGROUND OF THE INVENTION

In dealing with data which has been obtained experimentally or by some other means, and which can be presented graphically, it is frequently desired to determine a reasonable analytical representation such that any data point can be expressed through an algebraic equation. Such an analytical representation is desired if the data is to be used as a computer input. However, empirical data of such a nature may be so complex in nature that a simple analytical expression which will adequately describe it would be difficult to find and any known method which could be used for determining an analytical expression is extremely laborious.

According to this invention, means are provided for obtaining data from an unknown curve by comparing the unknown curve with known curves whereby the data can be used as an input for a computer so that the data may be more readily analyzed or reproduced. A plurality of known functions $y=F(x)$ are provided for comparison with a curve representing the unknown data. A transparency such as a film negative containing the unknown curve, as the transparent portion, is placed adjacent a second transparency or film negative containing a plurality of curves also prepared as the transparent portion. The combination is then illuminated and correlation between predetermined portions of the unknown curve and the known functions is sensed with photocells. The film containing the known functions also contains binary information on a magnetic tape corrsponding to the known function within that section of the film. Since correlation might occur in various relative positions between the film coordinate system and the coordinate system of the unknown curve, a displacement function must be provided so that the unknown function can be analyzed in the computer by the use of conventional coordinate transformation and curve analysis theory. The displacement information and binary function information for each portion are stored on a magnetic drum for each section of the unknown curve where correlation is obtained until correlation information is obtained for each section of the whole unknown curve, so that the curve information for the whole curve can be fed to the computer simultaneously.

When only a few curves need to be analyzed, a templet may be provided containing different known functions of $x$ and $y$, around its periphery, all related to the same coordinate system. With this device, information relating to the $x$, the $y$ and the angular displacement between the coordinate system of the known functions and the coordinate system of the unknown curve and the beginning and end points where the unknown curve agree with each known curve must be obtained for supplying to the computer so that the curve may be analyzed by conventional coordinate transformation and curve analysis theory.

DESCRIPTION OF THE PREFERRED EMBODIMENT

Figure 1:
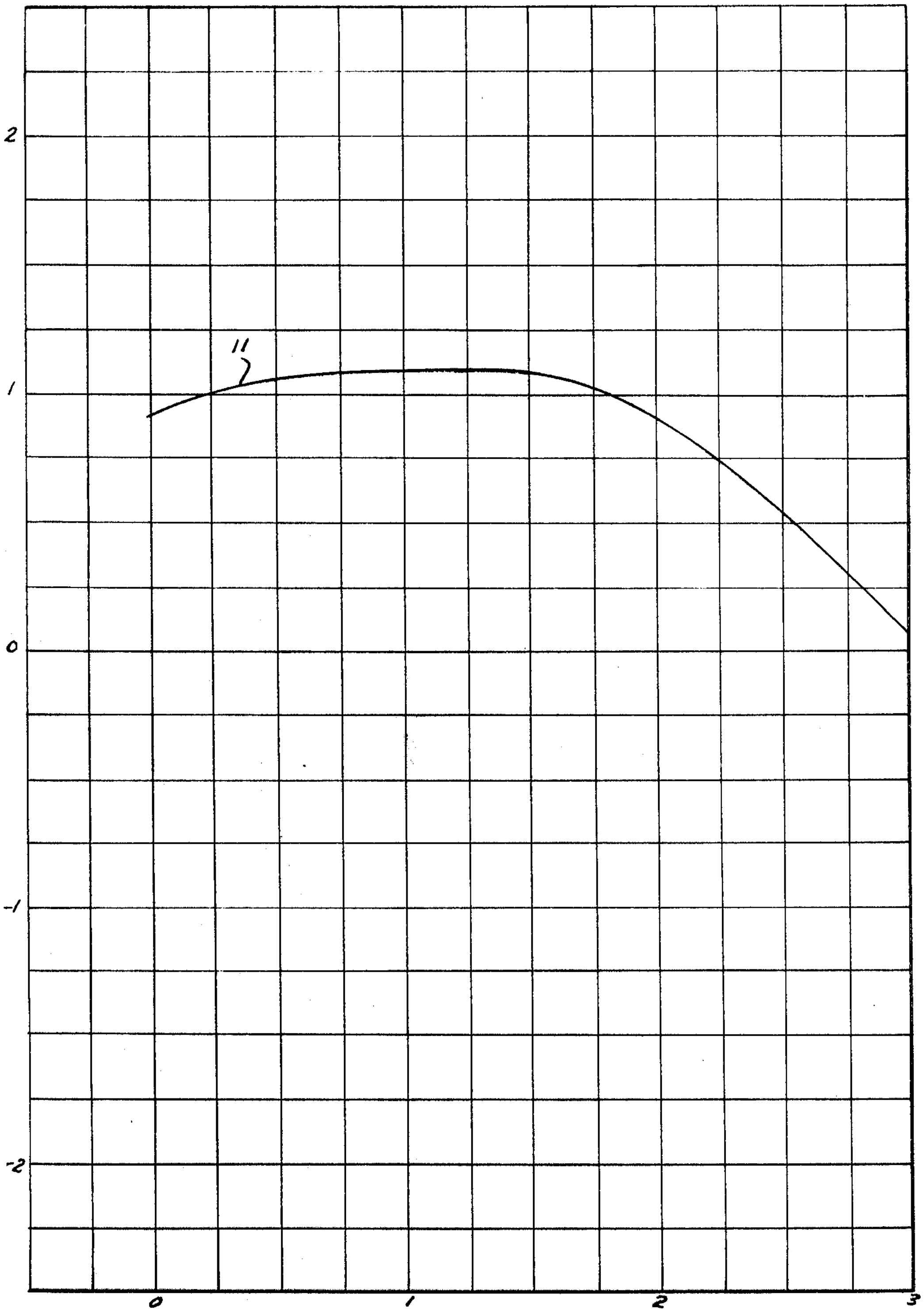
FIG. 1 shows an enlarged illustration of one possible unknown curve which could be analyzed with the device of the invention.
Figure 2:
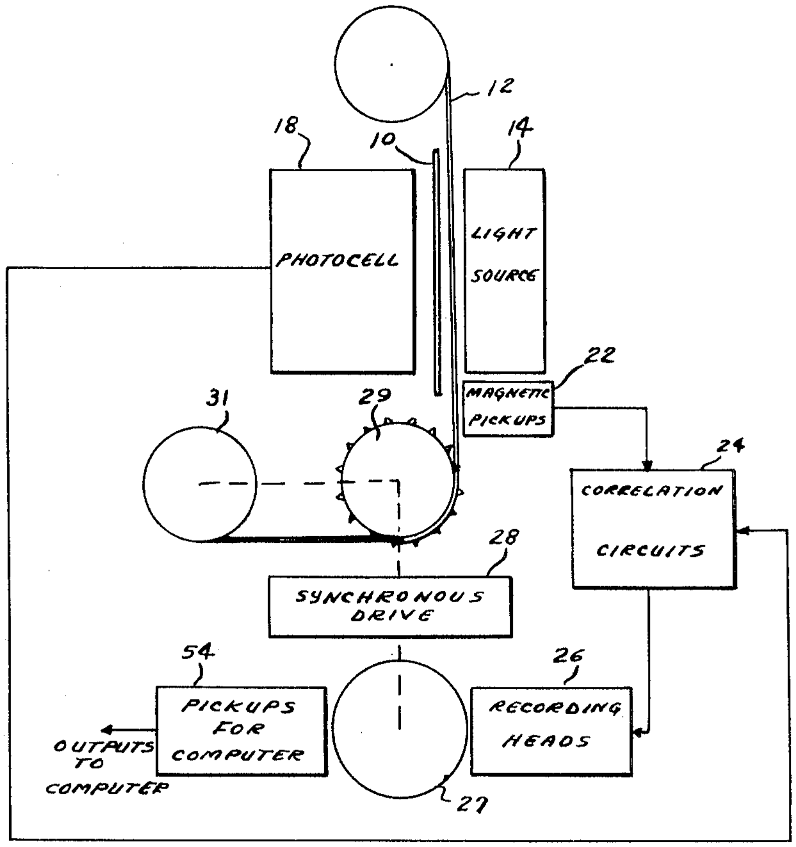
FIG. 2 is a general block diagram of the device for obtaining analytical data from an unknown curve according to one embodiment of the invention.
Figure 4:
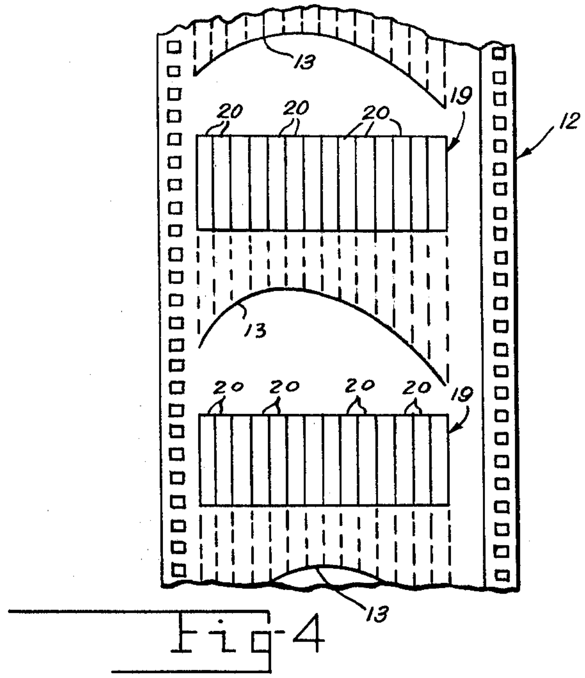
FIG. 4 is a plan view of a section of film for use in the device of FIG. 2.
Figure 3:
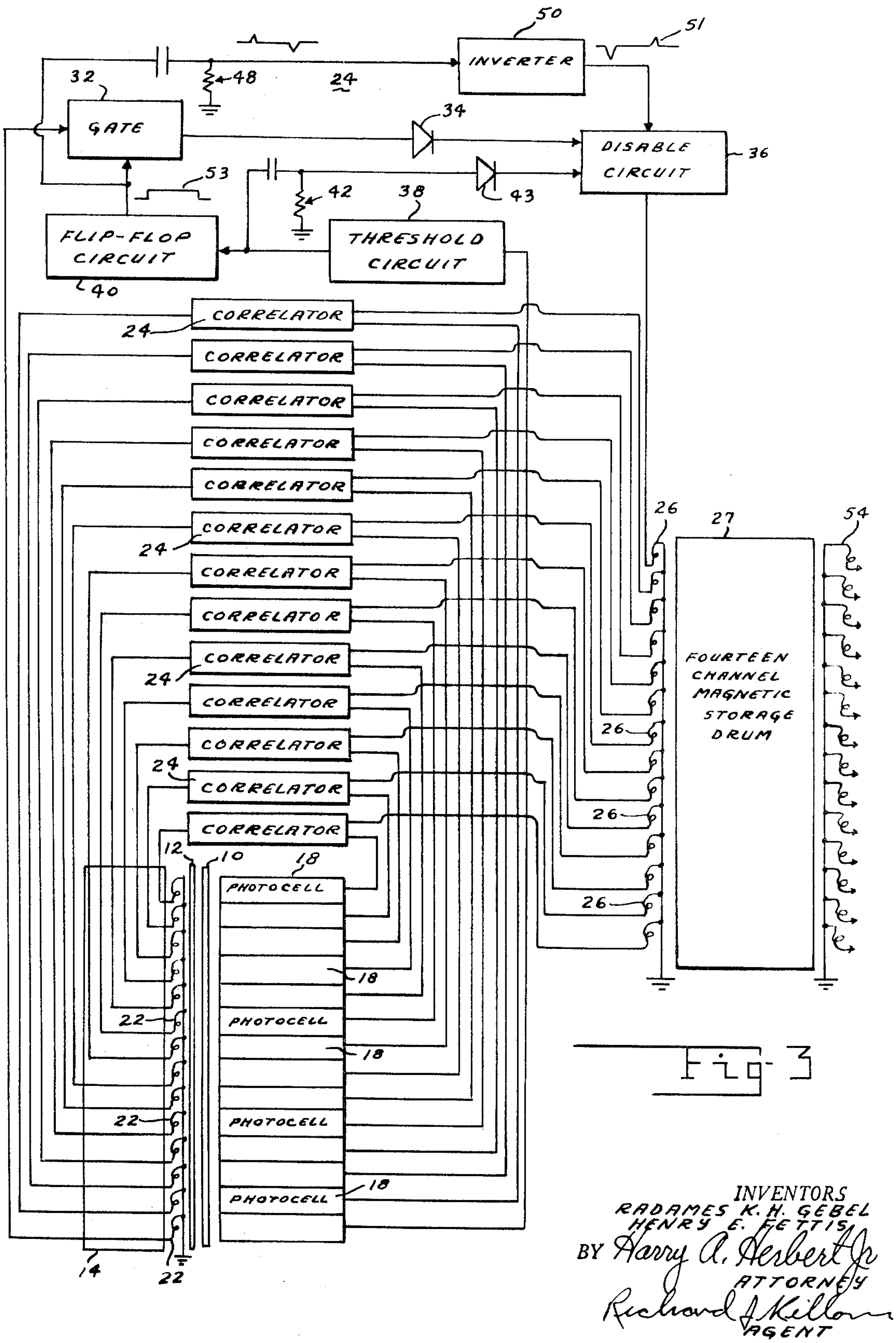
FIG. 3 is a more detailed block diagram of curve comparing circuit of the device of FIG. 1.

Reference is now made to FIGS. 2 and 3 of the drawing wherein a film transparency 10 containing an unknown function such as shown at 11 in FIG. 1 is positioned adjacent a second film transparency 12 containing a plurality of functions such as the one shown at 13, in FIG. 4. The transparency combination is illuminated by the light source indicated generally at 14. Correlation between predetermined sections of the known function and the unknown curve is determined by means of a plurality of photocells indicated generally at 18 which are separated by dividers as shown in FIG. 3.

The film 12 besides containing the transparent curve also contains a magnetic storage medium 19 comprising a plurality of channels 20 wherein a position indicating pulse and binary information relating to each section of the known function is stored in said plurality of channels indicated at 20, which correspond to the number of photocells used. The film may be prepared in a manner known in the art such as by providing standard magnetic film with the transparencies containing the curves spliced into cutouts therein or the film may be conventional photographic film coated with magnetic material in the areas desired.

A plurality of magnetic pickup heads 22, equal to the number of photocells, are located adjacent the film 12. The binary information from the magnetic pickup heads 22 is fed to a corresponding correlation circuit 24. This information is passed to the recording heads 26 and magnetic drum 27 only when the corresponding photocell indicates that a correlation has been made or that there is substantial coincidence as determined by the setting of the threshold circuit 38 between a section of the unknown curve and a section of a known curve.

The rotation of the storage drum 27 is synchronized with the movement of the film by means of a conventional synchronous drive shown generally at 28 for example the drum may make one revolution for each frame. The drive 28 also drives the film drive 29 and takeup spool 31 in the conventional manner.

Figure 5:
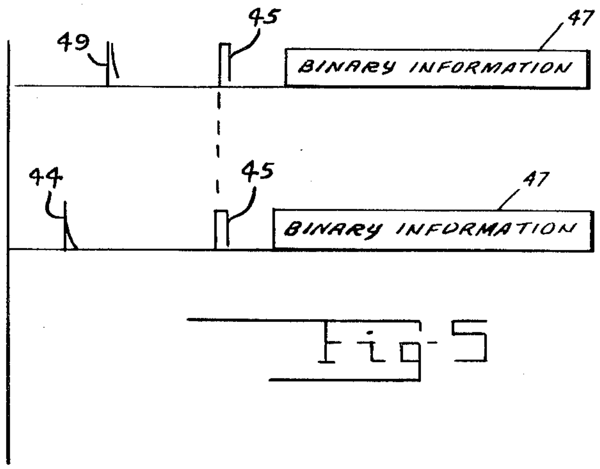
FIG. 5 shows generally the information that might be stored on the storage drum of the device of FIG. 2.

In FIG. 3 one of the correlators is shown in greater detail. The signal on the magnetic tape is picked up by a pickup head 22 and fed to a corresponding recording head 26 through a gate circuit 32, rectifier 34 and disable circuit 36. The gate circuit 32 is controlled by a correlation signal from a corresponding photocell 18 which is fed to a threshold circuit 38 and a flip-flop circuit 40. The threshold circuit 38 will not pass a signal unless the correlation between the two curves exceeds a predetermined level. The monostable flip-flop multivibrator circuit is designed to provide a gate pulse having a time interval great enough to pass all of the information recorded on the magnetic storage medium 19 between curve frames. The output of the threshold circuit is differentiated in differentiating circuit 42. The differentiated signal is applied to the recording head 26 through a rectifier 43 and disable circuit 36 to provide a position indicating pulse, as shown at 44 and 49, in FIG. 5. A position indicating pulse and descriptive information for the corresponding portion of the curve is stored in each of the channels 20 on the storage medium 19. The second position indicating pulse 45 is provided for all channels at the beginning of the magnetic medium before the storage information signal. When the correlation between the two curves exceeds the level set by the threshold circuits 38, the position indicating pulses and binary information, indicated generally at 47, corresponding to the channel wherein correlation has occurred in a corresponding channel on the storage drum 27. The position indicating pulses indicate the displacement.

To prevent double exposure of any channel on the storage drum 27, the trailing edge of the flip-flop output can be used to provide a disable signal. The flip-flop output is differentiated in differentiating circuit 48 inverted in an inverter 50 to provide a positive disable pulse 51 which is applied to disable circuit 36 to open the circuit between rectifiers 34 and 43 and the recording head 26.

When correlation has been accomplished for all channels, the information on drum 27 can be applied to a computer by means of pickup heads 54 in the conventional manner. Indicating means not shown may be provided to indicate when correlation is achieved in each of the channels, for example, either the output of the threshold circuit 38 or the disable pulse 51 could be used to operate an indicator.

In the operation of the device, the light is turned on with only the transparency 10 containing the unknown curve in position so that the threshold circuits can be set for a proper operating level. The film is then positioned in the device and adjusted to provide registry between the film 12 and the storage drum 27. The circuit is then energized and the film and drum drive is started. The film 12 containing the known functions then passes over the transparency 10 containing the unknown curve. The gate circuits 32 block application of the binary information on magnetic storage medium 19 to the drum 27 and no timing pulses appear in the output of the differentiating circuit 42 until a correlation has been made. When correlation has been accomplished for any section of the curve and a photocell output exceeds the level set by the threshold circuit 38 in the output of that photocell, a position indicating pulse 44 is fed to the corresponding recording head 26 through the disable circuit 36. The flip-flop circuit 40 is also energized to produce a gate pulse 53 to the gate circuit 32. During the time of the gate pulse the second position indicating pulse 45 and binary information stored on magnetic storage medium 19 for the corresponding channel are fed to the corresponding recording head 26 for application to the appropriate channel on storage drum 27. The binary information stored in each channel on magnetic storage medium relates to the known function $y=f(x)$ for the particular section of the curve to which it relates. Since the unknown curve is substantially identical for that section of the curve, when correlation is achieved, this known function would also apply for that section of the curve. The only information that is then needed to analyze that section of the curve according to its own coordinate system is to know the displacement of the two coordinate systems when correlation is achieved and this information is supplied by the position indicating pulses. Since information is stored on the drum only when a gate pulse 53 is produced, the trailing edge of this pulse can be used to provide a disabling pulse 51 to break the circuit between the rectifiers 34 and 43 and the corresponding head 26. This may be accomplished with a circuit breaking relay or any other well known means.

While the device thus far described permits relative motion between the curves, only in the $y$ direction, it may sometimes be desirable in the analysis of some curves to have relative angular or $x$ direction motion though not shown. This could be accomplished by providing such motion to the mask 10 containing the unknown curve.

Although magnetic storage means have been described for the film 12 and storage drum 27, other storage means such as optical could be used and in some applications a combination of different types of storage systems may be desired.

Figure 7:
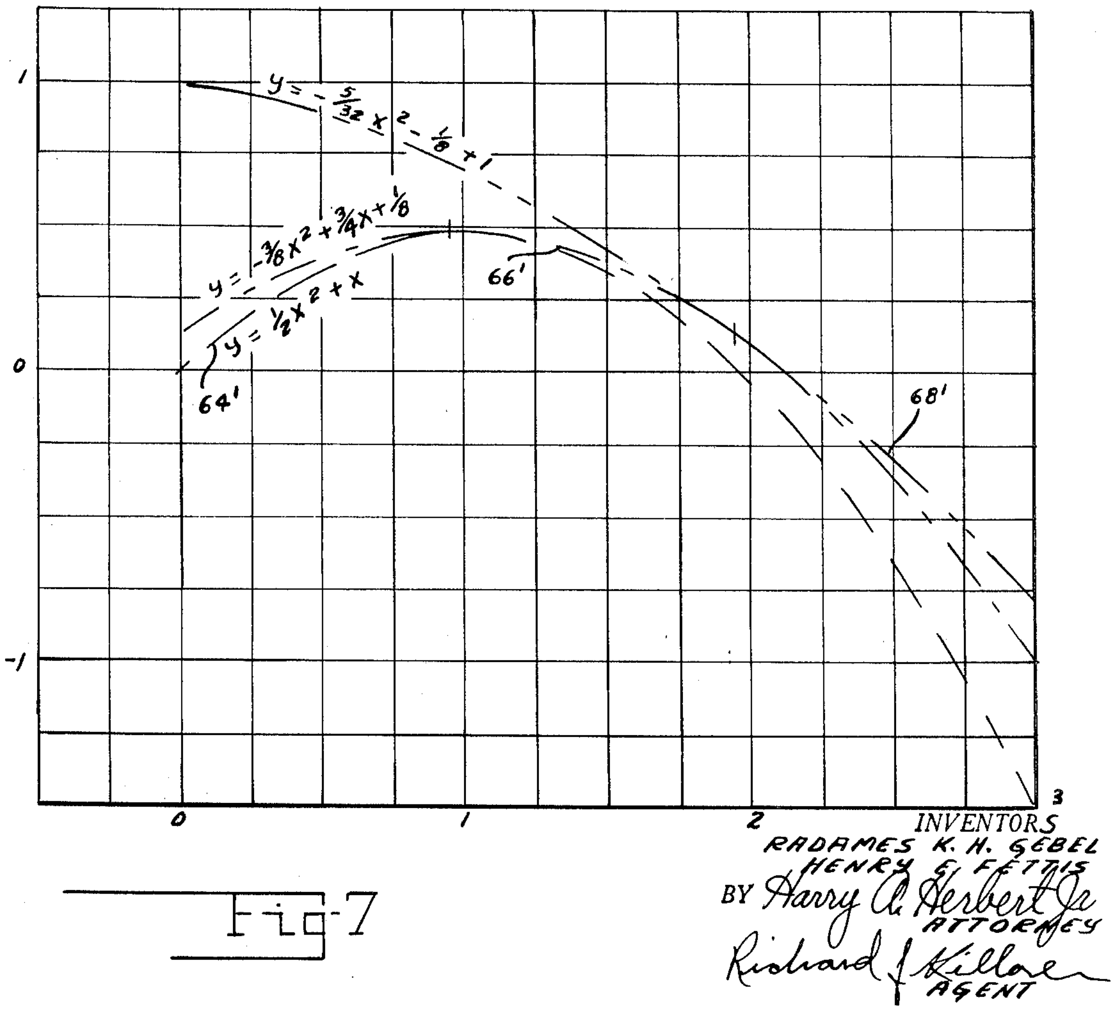
FIG. 7 shows curves for the known functions used in making the instrument of FIG. 6.
Figure 8:
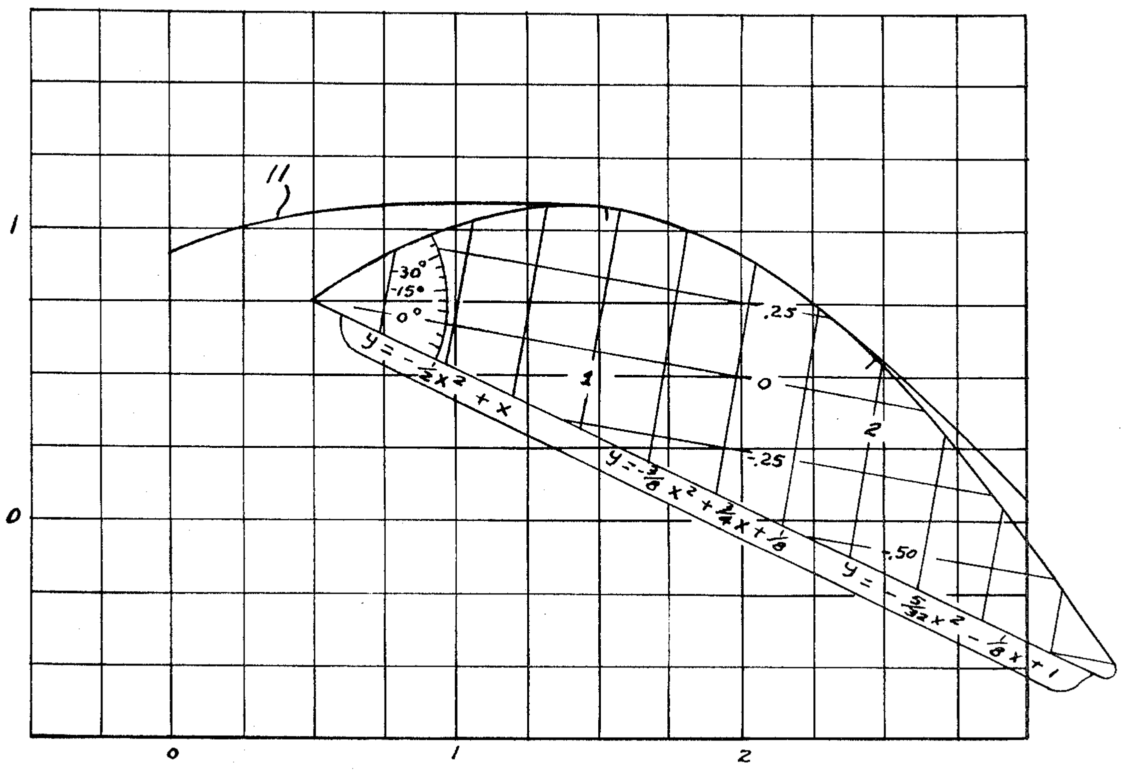
FIG. 8 shows the instrument of FIG. 6 used in obtaining analytical data from the curve of FIG. 1.
Figure 6:
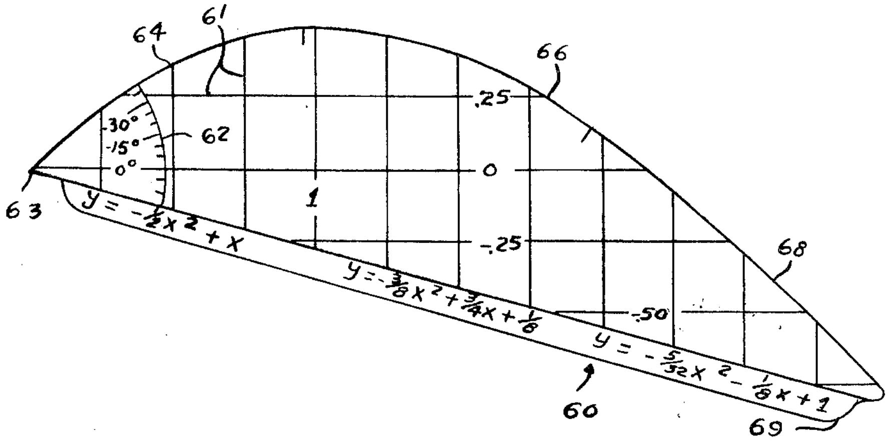
FIG. 6 is a geometric instrument for use in obtaining analytical data from an unknown curve according to another embodiment of the invention.

The device thus far described would be used when a great number of curves are to be analyzed. However, when only limited use is required, such a device would be impractical. A simple geometric instrument that could be used is shown in FIG. 6 which shows a curve analyzer 60 having its own cartesian coordinate system 61, and protractor 62, with the $x$ and $y$, zero position being located at point 63. The curved edge of the analyzer has a plurality of discrete portions marked off by lines 65 which follow known functions of $y=F(x)$. The portion 64 of the curve analyzer follows the first portion of curve 64' in FIG. 7. The portion 66 of the curve analyzer follows the middle portion of curve 66' in FIG. 7 and the portion 68 follows the end portion of curve 68' in FIG. 7. The side of the analyzer opposite the curved portion has a projection 69 which contains the function corresponding to each part of the curve. While three functions are shown, it is to be understood that more or fewer functions could be provided if desired. Also the particular functions selected could be adapted to a particular family of curves, if desired, such as the flight path of a space vehicle on launch.

In the use of the device of FIG. 6 to analyze a curve for example, such as shown at 11 in FIG. 1, the curve analyzer is moved into a position where a portion of the unknown curve coincides with a portion of the analyzer. The data to be supplied to the computer is then read off of the unknown curve coordinate system and the curve analyzer coordinate system. For example, with the curves as shown, the $x$ and $y$ zero point of the curve analyzer coordinate system is at $x=.5$ and $y=.75$ on the curve 11 coordinate system. The analyzer system is rotated at an angle $-10°$ with respect to the curve 11 coordinate system. The curves coincide from $x=.8$, $y=.45$ to $x=.95$, $y=.48$ for the function $y=\frac{1}{2}x^2+x$. The curves also coincide from $x=.95$, $y=.48$ to $x=1.7$, $y=.25$ for the function $$y=\frac{3}{8}x^2+\frac{3}{4}x+\frac{1}{8}$$

When like information is obtained for the whole of curve 11, the curve can be analyzed by means of a computer by using conventional coordinate transformation and curve analysis theory.

While a single curve analyzer is shown, several curve analyzers containing different functions may be required for the proper analysis of some curves.

There is thus provided an instrument and apparatus for obtaining data from an unknown curve which can be used as an input for a computer.

While certain specific embodiments have been described, it is obvious that numerous changes may be made without departing from the general principles and scope of the invention.

We claim:

1. A device for obtaining and storing analytical data, which can be fed to a computer, from a curve of an unknown function, by comparison with a plurality of known functions comprising: a first transparency having thereon the unknown curve as the transparent portion thereof in a first coordinate system; a second transparency having thereon a plurality of curves of different known functions $y=F(x)$ as transparent portions thereon each on a separate $x$–$y$ coordinate system; said plurality of curves being positioned in separate frames spaced along the lengths of said second transparency in one of the two coordinate directions; means for comparing predetermined discrete portions of said unknown curve with predetermined discrete portions of the curves for the known functions to determine coincidence between the discrete portion of the unknown curve and the discrete portions of the curves for known functions; means including a storage medium in each of said frames on said second transparency for storing descriptive digital information in separate channels for each of the discrete sections of the curves for the known functions; said storage medium also having a position indicating pulse stored thereon in each frame between the curve and the descriptive digital information in each channel; a separate storage means for receiving descriptive information for the discrete sections of the unknown curve when coincidence has been achieved; means, responsive to said comparing means, for supplying a first position indicating pulse to said separate storage means in each channel when coincidence is achieved in that channel; means for transferring stored information including the second position indicating pulse stored on said second transparency to said separate storage means; means responsive to said comparing means for blocking the transfer of information from said second transparency to said separate storage means at all times except during a predetermined time interval after coincidence has been achieved between a discrete section of the known and unknown curves and means for blocking further transfer of information for a discrete section of the unknown curve after information for that section of the unknown curve has been stored on said separate storage means.

2. A device as recited in claim 1 wherein said second transparency is a film strip and said means for comparing discrete portions of the unknown curve with discrete portions of the known function, include means for moving the fiilm past the transparency having the unknown curve thereon, a light source on one side of the film and first transparency and a plurality of photocells positioned across the width of the film adjacent each of the discrete portions and a threshold circuit responsive to the output of each of the photocells.

3. The device as recited in claim 2 wherein said separate storage means is a magnetic recording drum and said means on the second transparency for storing descriptive digital information, is magnetic storage means; means for moving said magnetic storage drum in synchronism with the movement of said film; said means for transferring information including a magnetic pickup head adjacent each of the discrete portions of said film and a magnetic recording head electrically connected to each of said pickup heads; said recording heads being positioned adjacent said magnetic recording drum; and wherein said means for blocking the transfer of information includes gate circuits connected between the magnetic pickup heads and said magnetic recording heads; and means connected to the output of each of said threshold circuits, for applying elongated gate pulses to said gate circuits when coincidence is achieved.

References Cited

UNITED STATES PATENTS

| | | | |
|---|---|---|---|
| 2,829,824 | 4/1958 | Schuster. | |
| 2,829,825 | 4/1958 | Georges-Doll. | |
| 3,202,761 | 8/1965 | Bibbero ---------- | 340—149 X |

MALCOLM A. MORRISON, Primary Examiner

F. D. GRUBER, Assistant Examiner

U.S. Cl. X.R.

33—1; 235—61.6, 181; 340—146.2